United States Patent [19]
Rocca

[11] Patent Number: 6,120,827
[45] Date of Patent: Sep. 19, 2000

[54] METHOD FOR FORMING IDENTICAL PASTA DOUGH SHAPES

[76] Inventor: Anthony Rocca, 520 S. Mill St., New Castle, Pa. 16101

[21] Appl. No.: 09/332,418

[22] Filed: Jun. 14, 1999

[51] Int. Cl.[7] .................................. A21D 6/00; A23P 1/00
[52] U.S. Cl. ............................. 426/503; 83/932; 426/512; 426/518
[58] Field of Search ...................... 426/512, 503, 426/518, 496, 549; 83/111, 113, 932; 425/294, 298, 363; 264/153, 163

[56] References Cited

U.S. PATENT DOCUMENTS

| | | | |
|---|---|---|---|
| 3,494,302 | 2/1970 | Wolf et al. ............................. | 426/503 |
| 5,304,055 | 4/1994 | Van Lengerich et al. ............... | 426/503 |
| 5,388,489 | 2/1995 | Dayley ..................................... | 426/503 |
| 5,529,799 | 6/1996 | Bornhorst et al. ...................... | 426/503 |

*Primary Examiner*—George C. Yeung
*Attorney, Agent, or Firm*—Harpman & Harpman

[57] ABSTRACT

A method of dough processing for dividing dough sheets into separate decorative portions in which a continuous repetitive die cuts of interlocking shapes therein. A no waste shape cutting method in which a plurality of identical interlocking shapes are derived from processed dough strips. Each representation defines a portion of an adjacent identical shape thereby utilizing essentially all of the usable dough with little or no waste associated therewith.

4 Claims, 5 Drawing Sheets

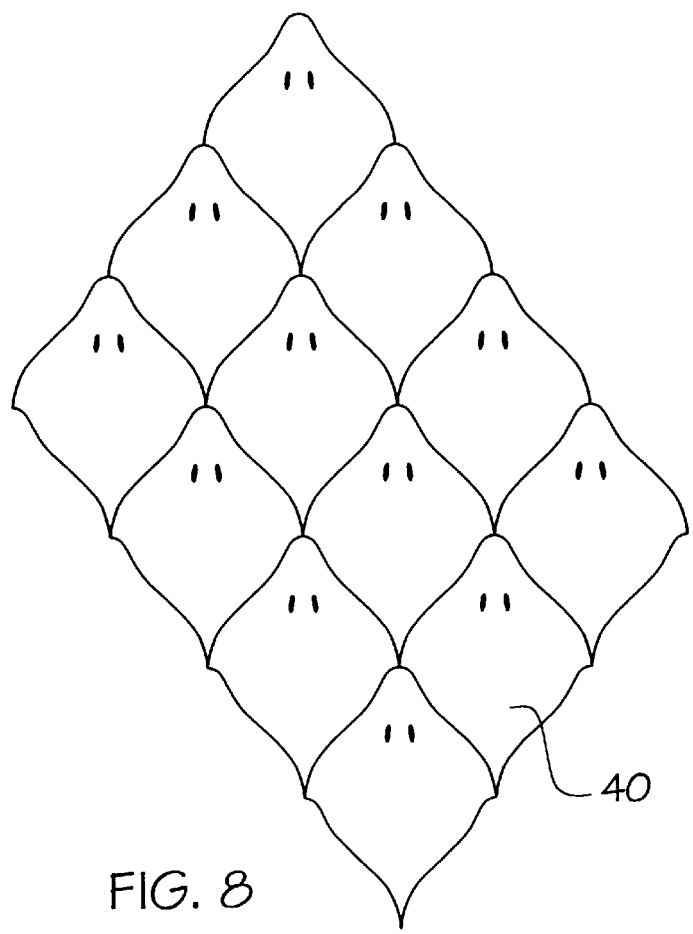
FIG. 8
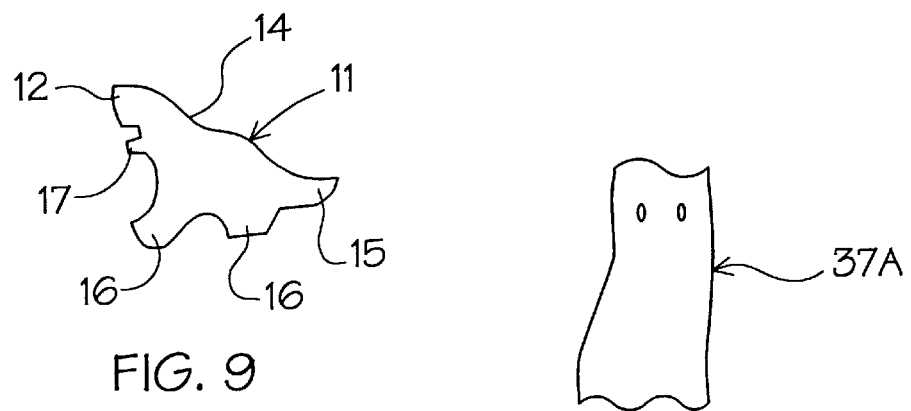
FIG. 9
FIG. 10

METHOD FOR FORMING IDENTICAL PASTA DOUGH SHAPES

BACKGROUND OF THE INVENTION

1. Technical Field

This invention relates to pasta dough processing systems that cut and process pasta dough sheets into usable sized shapes.

2. Description of Prior Art

Prior art methods and apparatus of this type are typically directed to actual dough cutting devices and systems in which dough is processed through multiple steps including manual cutting devices, see for example U.S. Pat. Nos. 5,388,489 and 5,529,799.

In U.S. Pat. No. 5,388,489 a dough sheet rotary cutting device is disclosed within a dough processing system wherein a rotary cutting head is engaged against a process dough sheet cutting out pre-formed shapes. Excess dough cut from the shape is transferred within the cutting head for gathering and reuse.

In U.S. Pat. No. 5,529,799 an apparatus and method for recouping scrap dough material wherein multiple shapes are sequentially cut from a dough sheet with no scrap material between the representative cut pieces.

SUMMARY OF THE INVENTION

A method of pasta dough processing utilizing a variety of design shapes that represent fanciful, mythical and real figures in identical side by side pattern wherein portions of each shape forms a non-corresponding portion of the adjacent identical shape. Such an interlocking identical arrangement imparts a no waste utilization of pasta dough product that is presented in elongated continuous strips of limited transverse dimension that correspond to the shapes cut therefrom.

DESCRIPTION OF THE DRAWINGS

FIG. 8 shows a partial top plan view of a stingray shape representation of interlocking multiple cut shaped portions on a portion of a dough strip;

FIG. 9 is a top plan view of a single cut-out shape portion derived from the interlocking cut-out shapes of a dinosaur;

FIG. 10 is a top plan view of a single cut-out shape portion derived from the interlocking cut-out shapes of a ghost;

DESCRIPTION OF THE PREFERRED EMBODIMENT

Figure 1:
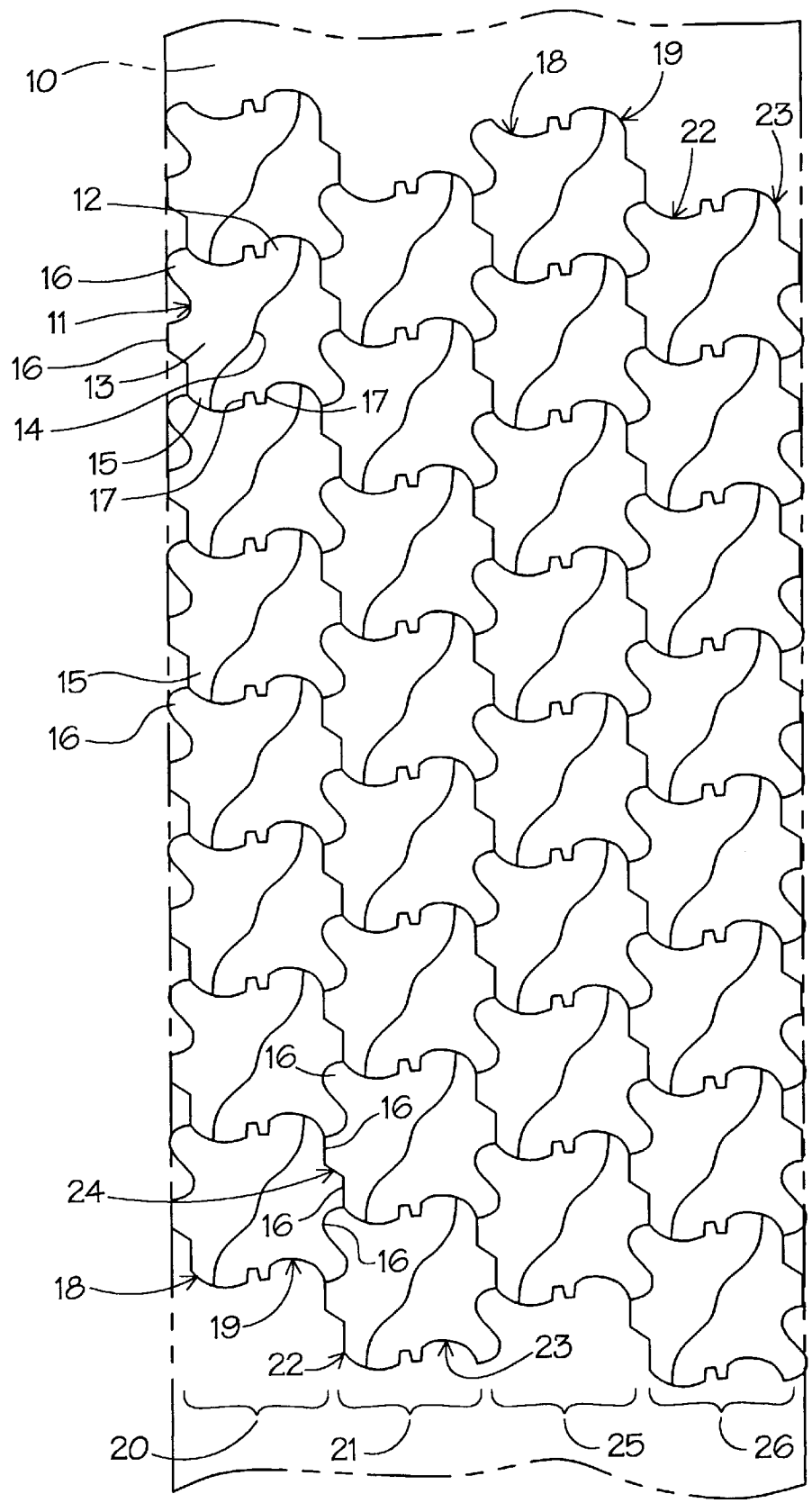
FIG. 1 shows a partial top plan view of a dinosaur shape representation of interlocking multiple cut shaped portions on a portion of a dough strip.
Figure 2:
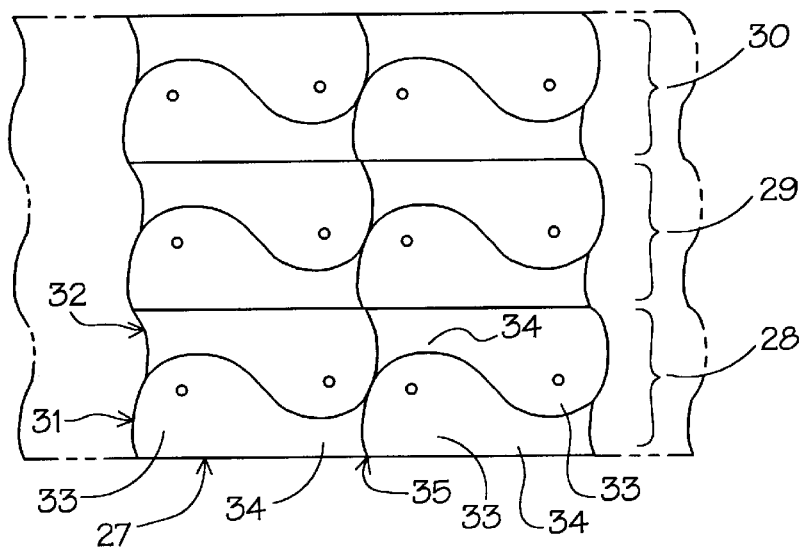
FIG. 2 shows a partial top plan view of a whale shape representation of interlocking multiple cut shaped portions on a portion of a dough strip.

Referring to FIG. 1 of the drawings, a method of pasta dough processing can be seen by way of illustration showing prepared pasta dough 10 to be cut into usable consumable shapes. A first dinosaur representation shape 11 can be seen within a plurality of identical shapes, each having a head portion 12, and a main body portion 13 which defines a back surface at 14. A tail portion 15 and feet portion 16 extend from the main body portion 13 with an arm portion at 17 which will be well understood by those skilled in the art.

The first dinosaur shape 11 repeats itself in a tail 15 to foot 16 relationship within a first elongated dough strip generally indicated at 18. A second tail to foot strip 19 of dinosaur shapes 11 is interengaged with the first strip 18 by interlocking shaped elements of the back surfaces at 14 and the arm portion 17 combining to define an elongated dough band at 20.

A second dough band 21 having identical dinosaur arranged strips 22 and 23 is correspondingly interengaged with the first dough band 20 in a staggered engagement pattern of interlocking feet portion 16 of the respective abutting first and second strips of dinosaur shapes in each of the respective bands 19 and 22 as generally indicated at 24. In this example, multiple identical dough bands 20, 21, 25 and 26 are combined in a side by interlocking side relationship to define a maximum product transverse dimension which as illustrated in FIG. 1 of the drawings to be inclusive of the multiple dough strips 18, 19, 22 and 23, each having the respective identical reverse host strips of identical shaped dinosaur representations 18 and 19 and 22 and 23 as herein before described.

Referring now to FIGS. 2–6 of the drawings, a number of other interlocking cut-out shape representations can be seen. Specifically in FIG. 2 of the drawings, a plurality of whale shape representations 27 with configured dough bands 28, 29 and 30, each of which define interlocking whale shape strips 31 and 32 wherein a head portion 33 to tail portion 34 end to end alignment at 35 and adjacent tail portion 34 to head portion 33 in an adjacent interlocking strip 32 is illustrated.

This unique interengaging alignment of identical cut shaped portions is repeated in each of the shape representations illustrated in the following figure pairs of a multiple interengaged shape and single shape representation.

Figure 5:
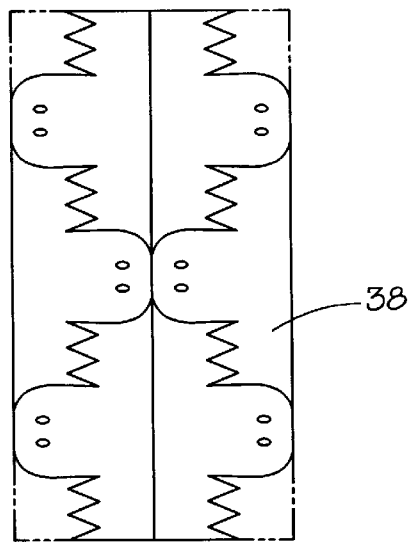
FIG. 5 shows a partial top plan view of a goblin shape representation of interlocking multiple cut shaped portions on a portion of a dough strip.
Figure 3:
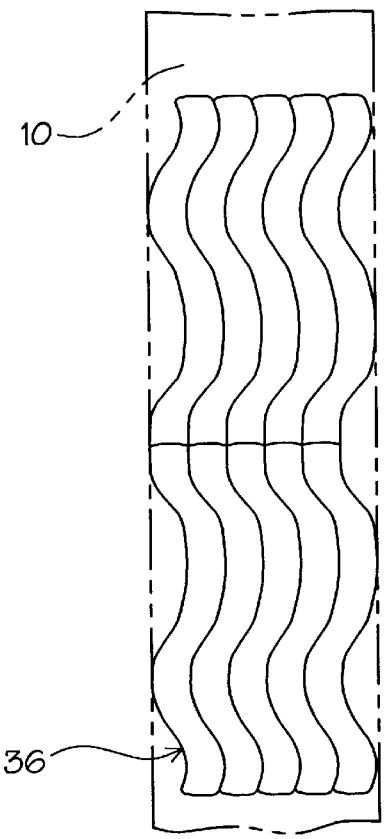
FIG. 3 shows a partial top plan view of a worm shape representation of interlocking multiple cut shaped portions on a portion of a dough strip.
Figure 4:
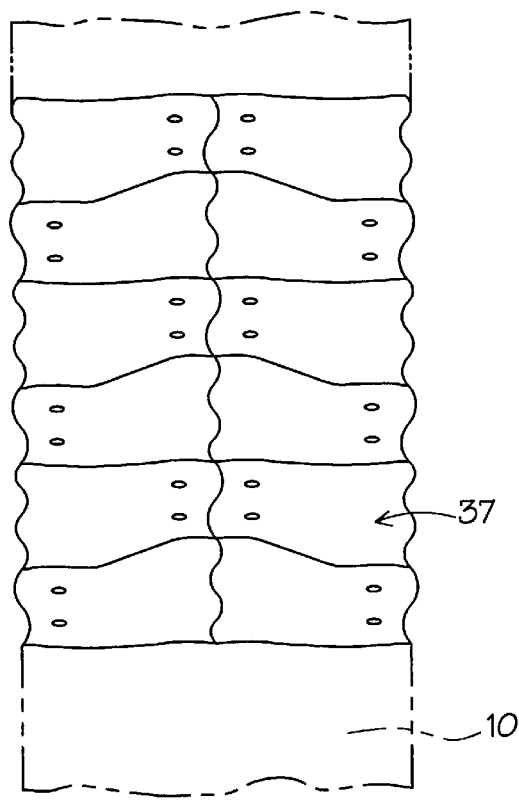
FIG. 4 shows a partial top plan view of a ghost shape representation of interlocking multiple cut shaped portions on a portion of a dough strip.
Figure 6:
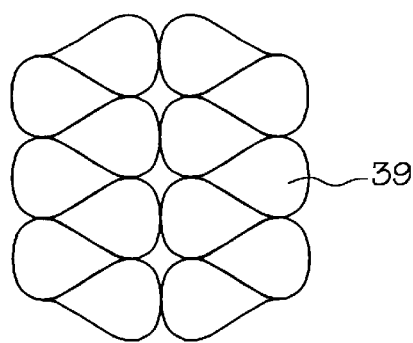
FIG. 6 shows a partial top plan view of a tadpole shape representation of interlocking multiple cut shaped portions on a portion of a dough strip.
Figure 7:
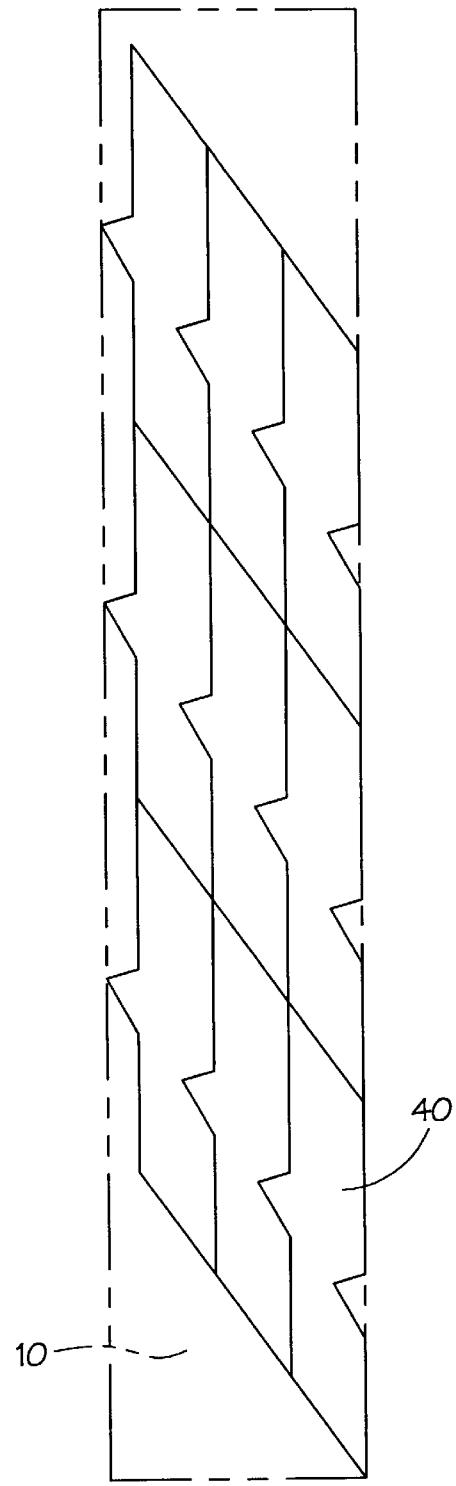
FIG. 7 shows a partial top plan view of a shark shape representation of interlocking multiple cut shaped portions on a portion of a dough strip.
Figure 11:
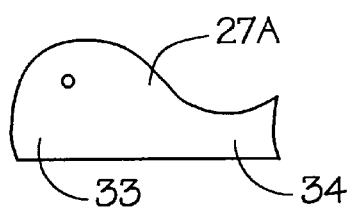
FIG. 11 is a top plan view of a single cut-out shape portion derived from the interlocking cut-out shapes of a whale.
Figure 12:
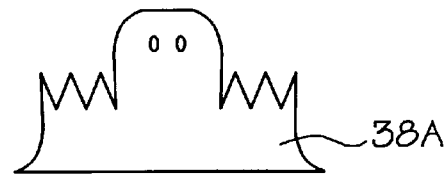
FIG. 12 is a top plan view of a single cut-out shape portion derived from the interlocking cut-out shapes of a goblin.
Figure 14:
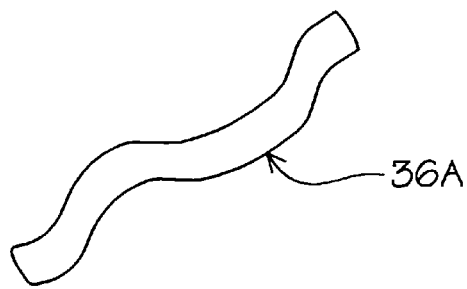
FIG. 14 is a top plan view of a single cut-out shape portion derived from the interlocking cut-out shapes of a worm.
Figure 13:
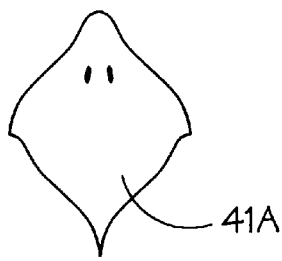
FIG. 13 is a top plan view of a single cut-out shape portion derived from the interlocking cut-out shapes of a stingray.
Figure 15:
FIG. 15 is a top plan view of a single cut-out shape portion derived from the interlocking cut-out shapes of a tadpole.
Figure 16:
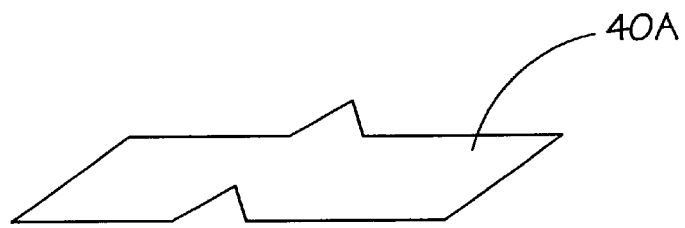
FIG. 16 is a top plan view of a single cut-out shape portion derived from the interlocking cut-out shapes of a shark.

In FIGS. 3 and 14, worm shapes 36 and 36A respectively, FIGS. 4 and 10, ghost shapes 37 and 37A respectively, FIGS. 5 and 12, goblin shapes 38 and 38A respectively, FIGS. 6 and 15, tadpole shapes 39 and 39A respectively, FIGS. 7 and 16, shark shapes 40 and 40A respectively, FIGS. 8 and 13, stingray shapes 41 and 41A respectively, and in FIG. 9 of the drawings a hereinbefore disclosed dinosaur shape 11 illustrated in FIG. 1 of the drawings.

Accordingly, the method of pasta dough processing as illustrated by the interlocking interengaging shapes 27, 36–40 and dinosaur shape 11 in parallel interengaging strips 18 and 19 and 22 and 23 in respective pasta dough bands 20 and 21, etc. for the formation of the individual pasta dough shapes of the type that are particularly dried before cooking.

The pasta dough processing of the multiple interlocking shapes to form individual shape representations 11, 27–41 of the invention impart little or no pasta dough waste.

Thus, it will be seen that a new and novel pasta dough processing method has been illustrated and described that defines elongated bands of processed pasta dough into identical reversed registration strips of shaped figures in which elements of the shaped figure interlock with one another and correspondingly interengage adjacent processed dough strips to form a larger processing band of dough with minimal waste, and it will be apparent to those skilled in the art that various changes and modifications may be made therein without departing from the spirit of the invention.

Therefore I claim:

1. A method of maximizing pasta dough used when forming decorative pasta shapes for human consumption within a continuous pasta dough sheet comprises, the steps of;
   a. dividing the pasta dough sheet into a plurality of adjacent bands by defining strips of abutting identical decorative shapes in each of said bands,
   b. said strips having interlocking identical registration perimeter edges defined by identical decorative shapes,
   c. interengaging said adjacent pasta bands by directionally reversed registration with identical perimeter edge surfaces,
   d. registering said directionally reversed registration perimeter edge surfaces of adjacent pasta bands in staggered transverse alignment to one another,
   e. separating said divided sheets into individual identifiable pasta shape representations.

2. The method of claim 1 wherein the step of defining strips of abutting identical decorative shapes comprises, cutting the strips of linked identical decorative strips into identical pasta portions of an interlocking adjacent character.

3. The method of claim 1 wherein the step of interengaging said adjacent pasta bands by directionally reversed registration comprises, inverting the adjacent strip of linked decorative shapes for adjacent interengagement therewith.

4. The method of claim 1 wherein the step of registering said directionally reversed registration perimeter edge surfaces of said adjacent pasta bands in staggered transverse alignment comprises, interengagement registration of a second strip of linked identical decorative shape in a first outer pasta band with a first strip of said linked identical decorative shape in a second adjacent pasta band.

* * * * *